(12) United States Patent
Shimazaki et al.

(10) Patent No.: US 12,378,161 B2
(45) Date of Patent: Aug. 5, 2025

(54) CEMENT ADMIXTURE, EXPANSION MATERIAL, AND CEMENT COMPOSITION

(71) Applicant: DENKA COMPANY LIMITED, Chuo-ku (JP)

(72) Inventors: Daiki Shimazaki, Ichihara (JP); Taiichiro Mori, Itoigawa (JP)

(73) Assignee: DENKA COMPANY LIMITED, Chuo-ku (JP)

( * ) Notice: Subject to any disclaimer, the term of this patent is extended or adjusted under 35 U.S.C. 154(b) by 478 days.

(21) Appl. No.: 17/996,717

(22) PCT Filed: Apr. 22, 2021

(86) PCT No.: PCT/JP2021/016338
§ 371 (c)(1),
(2) Date: Oct. 20, 2022

(87) PCT Pub. No.: WO2021/215509
PCT Pub. Date: Oct. 28, 2021

(65) Prior Publication Data
US 2023/0242448 A1    Aug. 3, 2023

(30) Foreign Application Priority Data

Apr. 23, 2020  (JP) .............................. 2020-076574

(51) Int. Cl.
| | |
|---|---|
| C04B 22/14 | (2006.01) |
| C04B 22/06 | (2006.01) |
| C04B 28/02 | (2006.01) |
| C04B 28/16 | (2006.01) |
| C04B 40/00 | (2006.01) |
| C04B 22/00 | (2006.01) |

(52) U.S. Cl.
CPC .............. *C04B 28/16* (2013.01); *C04B 22/06* (2013.01); *C04B 22/143* (2013.01); *C04B 28/02* (2013.01); *C04B 40/0039* (2013.01); *C04B 22/008* (2013.01); *C04B 22/14* (2013.01)

(58) Field of Classification Search
CPC ....... C04B 28/16; C04B 22/06; C04B 22/143; C04B 28/02; C04B 40/0039; C04B 22/008; C04B 22/14; C04B 22/062; C04B 22/064; C04B 7/323; C04B 7/345
See application file for complete search history.

(56) References Cited

U.S. PATENT DOCUMENTS

| | | |
|---|---|---|
| 2012/0067251 A1 | 3/2012 | Higuchi et al. |
| 2014/0230696 A1 | 8/2014 | Bullerjahn et al. |
| 2014/0283712 A1 | 9/2014 | Bullerjahn et al. |

FOREIGN PATENT DOCUMENTS

| | | | |
|---|---|---|---|
| CN | 102459116 A | 5/2012 | |
| CN | 104609750 A | 5/2015 | |
| EP | 3109215 A1 * | 12/2016 | ........... C04B 28/065 |
| JP | 53-099228 A | 8/1978 | |
| JP | 54-093020 A | 7/1979 | |
| JP | 2003-012352 A | 1/2003 | |
| JP | 4244261 B2 | 3/2009 | |
| JP | 2014-525890 A | 10/2014 | |
| JP | 2015-187068 A | 10/2015 | |
| JP | 6568291 B1 | 8/2019 | |
| JP | 6641057 B1 | 2/2020 | |
| WO | WO 2013/023728 A2 | 2/2013 | |

OTHER PUBLICATIONS

Extended European Search Report issued Aug. 25, 2023, in corresponding European Patent Application No. 21792608.8 citing document 15 therein, 7 pages.
International Search Report issued Jun. 22, 2021 in PCT/JP2021/016338 filed on Apr. 22, 2021, citing documents 1 & 15-19 therein, 2 pages.
Combined Chinese Office Action and Search Report issued Feb. 11, 2023, in corresponding Chinese Patent Application No. 202180029239.X (with English Translation of Category of Cited Documents) citing documents 15-17 therein, 10 pages.
Huang, S. et al., "Modern concrete technology," Shaanxi Science and Technology Press, First edition in Oct. 1998, (with English translation), 17 pages.

* cited by examiner

*Primary Examiner* — Bryan D. Ripa
*Assistant Examiner* — Marites A Guino-O Uzzle
(74) *Attorney, Agent, or Firm* — Oblon, McClelland, Maier & Neustadt, L.L.P.

(57) ABSTRACT

A cement admixture containing free lime, gypsum, Ye'elimite, and ternesite, wherein the cement admixture has a mass ratio of the Ye'elimite to the ternesite (Ye'elimite/ternesite) of from 0.5 to 40. The cement admixture contains 20 to 80 mass % of the free lime. The cement admixture has a total mass ratio of the free lime and the gypsum anhydride to the ternesite ((free lime+gypsum anhydride)/ternesite) from 20 to 90. An expansive material which contains the cement admixture. A cement composition which contains the cement admixture.

5 Claims, No Drawings

CEMENT ADMIXTURE, EXPANSION MATERIAL, AND CEMENT COMPOSITION

CROSS REFERENCE TO RELATED APPLICATIONS

This application is a National Stage entry under 35 U.S.C. § 371 of PCT/JP2021/016338, filed on Apr. 22, 2021, and claims priority to Japanese Patent Application No. 2020-076574, filed on Apr. 23, 2020, the entire contents of which are incorporated herein by reference.

TECHNICAL FIELD

The present invention relates to a cement admixture, an expansive material, and a cement composition used in, for example, the civil engineering and architecture fields.

BACKGROUND ART

It is important to decrease cracking of a cement and a concrete, in view of the reliability durability fine appearance, etc. of a concrete structure, and thus a cement admixture having an effect to improve these, that is, the advance of further technique of a cement-based expansive material, is desired.

Until now, a concrete expansive material having an excellent swelling property with a small addition amount (PTL 1), an expansive material for a cement in which a surface of free lime is coated with calcium carbonate (PTL 2), etc. have been suggested. Furthermore, in recent years, combination use of an expansive material and a shrinkage decreasing agent is suggested (PTL 3).

CITATION LIST

Patent Literature

PTL 1: JP 4244261 B
PTL 2: JP 54-93020 A
PTL 3: JP 2003-12352 A

SUMMARY OF INVENTION

Technical Problem

However, conventional expansive materials were difficult to give a fine flow retention property at the time of a high temperature (30° C. or more), or were difficult to give an excellent initial strength expressing property.

For the reasons mentioned above, the object of the present invention is to provide a cement admixture that is preferable as an expansive material, which has a fine flow retention property even at the time of a high temperature, and can exert an excellent initial strength expression property.

Solution to Problem

As a result of intensive study based on the problem, the present inventors found that said problem can be solved by setting a mass ratio of Ye'elimite to ternesite (Ye'elimite/ternesite) in a cement admixture of a specific composition to be within a predetermined range, and completed the present invention. That is, the present invention is as mentioned below.

[1] A cement admixture containing free lime, gypsum anhydride, Ye'elimite, and ternesite, wherein a mass ratio of the Ye'elimite to the ternesite (Ye'elimite/ternesite) is 0.5 to 40.

[2] The cement admixture of [1], which contains 20 to 80 mass % of the free lime.

[3] The cement admixture of [1] or [2], wherein a total mass ratio of the free lime and the gypsum anhydride to the ternesite ((free lime+gypsum anhydride)/ternesite) is 20 to 90.

[4] An expansive material including the cement admixture of any one of [1] to [3].

[5] A cement composition containing the cement admixture of any one of [1] to [3].

Advantageous Effects of Invention

According to the present invention, a cement admixture that has a fine flow retention property even at the time of a high temperature and that can exert an excellent initial strength expression property, and thus is preferable as an expansive material, can be provided.

DESCRIPTION OF EMBODIMENTS

Hereinafter the cement admixture, expansive material and cement composition of the exemplary embodiments of the present invention will be explained. The part and % used in the present specification are based on mass unless specifically mentioned.

[1. Cement Admixture and Expansive Material]

The cement admixture of this embodiment contains free lime, gypsum anhydride, Ye'elimite, and ternesite. Hereinafter, the cement admixture will be explained in detail.

(Ye'elimite)

The Ye'elimite of this embodiment is a mineral represented by $3CaO \cdot 3Al_2O_3 \cdot CaSO_4$ and having a structure resembling hauyne $(Ca_2Na_6Al_6SiO_6O_{24}(SO_4)_2)$. It is hydrated in the presence of gypsum, etc. to form ettringite $(3CaO \cdot Al_2O_3 \cdot 3CaSO_4 \cdot 32H_2O)$ to contribute to the improvement of the initial strength.

The granularity of the Ye'elimite is preferably 4,500 to 12,000 $cm^2/g$, more preferably 5,000 to 10,000 $cm^2/g$ by a Blaine specific surface area in view of reactivity.

The content of the Ye'elimite is preferably 5 to 30 parts, more preferably 8 to 25 parts with respect to 100 parts of the cement admixture. By being 5 to 30 parts, the initial strength can be made fine.

(Ternesite)

Ternesite is a mineral represented by $5CaO \cdot 2SiO_2 \cdot SO_3$, and promotes a hydraulic reaction of the Ye'elimite. Furthermore, since the ternesite itself reacts little, it acts as a filler and may make the fluidity retention property fine. Therefore, slump loss can be decreased even at the time of a high temperature.

The content of the ternesite is preferably 1 to 20 parts, more preferably 3 to 18 parts, further preferably 5 to 15 parts with respect to 100 parts of the cement admixture. By being 1 to 20 parts, both acceleration of curing and fluidity retention property of the Ye'elimite can be made fine.

Here, a mass ratio of the Ye'elimite to the ternesite (Ye'elimite/ternesite) is set to 0.5 to 40, preferably 4 to 40, more preferably 6 to 30, and further preferably 8 to 25. If said mass ratio is lower than 0.5, a fine swelling property specifically a large length variation rate, cannot be obtained when applied to an expansive material. Furthermore, when said mass ratio goes beyond 40, the curing accelerating effect of the Ye'elimite by the ternesite becomes difficult to be obtained.
(Free Lime)

Free lime (f-CaO) is also referred to as free calcium oxide, and by incorporating free lime in the cement admixture of this embodiment, a swelling property is imparted, and as a result, drying shrinkage is suppressed.

The content of the free lime is preferably 20 to 80 parts, more preferably 25 to 60 parts with respect to 100 parts of the cement admixture. By incorporating by 20 to 80 parts, an effect to suppress drying shrinkage without causing the decrease in a long term strength expression property can be expressed.

In calcination for preparing the cement admixture, by increasing the calcination temperature, or by appropriately adjusting the content and granularity of the injection raw materials other than the CaO raw material, etc., the crystalline particle size of the free lime in the cement admixture can be increased, or the content can be increased.
(Gypsum Anhydride)

The gypsum anhydride of this embodiment is not specifically limited, but it is preferable to use Type II gypsum anhydride, and specifically it is preferable to utilize an acidic gypsum anhydride having a pH of 4.5 or less.

Here, the pH of the gypsum anhydride means the pH of a supernatant when 1 g of gypsum anhydride is put into 100 mL of pure water and stirred.

The granularity of the gypsum is preferably 2,000 $cm^2/g$ or more, more preferably 3,000 to 6,000 $cm^2/g$ by a Blaine specific surface area in view of the initial strength expression property. Note that the Blaine specific surface area value in the present specification can be obtained in accordance with JIS R 5201 (Method for Physical Testing of Cement).

The content of the gypsum is preferably 3 to 50 parts, more preferably 10 to 40 parts with respect to 100 parts of the cement admixture.

Note that in the case where the content of the gypsum in the cement admixture is small, gypsum in an amount ranging 3 to 50 parts can be separately added to 100 parts of the cement admixture.

Furthermore, the total mass ratio of the free lime and gypsum to the ternesite ((free lime+gypsum)/ternesite) is preferably 20 to 90, more preferably 30 to 70. By setting said mass ratio to 20 to 90, a fine swelling property by the free lime and gypsum becomes easy to be obtained.

The Blaine specific surface area of the cement admixture of this embodiment is preferably 2,000 to 6,000 $cm^2/g$, more preferably 2,500 to 5,000. Since the Blaine specific surface area is 2,000 to 6,000 $cm^2/g$, breaking of the concrete tissue can be prevented over a long time period of swelling when applied to an expansive material. Furthermore, the swelling performance can be maintained finely.

The cement admixture of the present invention can be obtained by appropriately mixing the CaO raw material, the $Al_2O_3$ raw material, the $SiO_2$ raw material, and the $CaSO_4$ raw material, etc. and sintering.

Examples of the CaO raw material include limestone and slaked lime, examples of the $Al_2O_3$ raw material include bauxite, aluminum residual ash, etc., examples of the $SiO_2$ raw material include silica stone, etc., examples of the $CaSO_4$ raw material include dihydrate gypsum, hemihydrate gypsum and anhydrous gypsum.

These raw materials can include impurities, but it is not specifically a problem within the range in which the effect of the present invention is not inhibited. Examples of the impurities can include MgO, $TiO_2$, MnO, $P_2O$, $Na_2O$, $K_2O$, $Li_2O$, sulfur, fluorine, chlorine, etc.

The cement admixture can be produced by incorporating the above-mentioned raw materials so as to give a desired mineral composition and conducting calcination. Before or after the calcination, pulverizing, etc. can appropriately be carried out.

The calcination method is not specifically limited, but it is preferable to calcinate by using an electric furnace, a kiln, etc. at a temperature of 1,100 to 1,600° C., and more preferably 1,200 to 1,500° C. At lower than 1,100° C., the swelling performance is not sufficient, whereas at greater than 1,600° C., the gypsum (specifically gypsum anhydride) can be decomposed.

Furthermore, in the case where pulverization is carried out, it is preferable to carry out by a known method so that the Blaine specific surface area becomes 2,000 to 6,000 $cm^2/g$.

The content of the mineral in the cement admixture prepared as above can be confirmed by a conventional, general analysis method. For example, the mineral can be quantified by confirming the generated mineral of the sample pulverized by a powder X-ray diffractometer and analyzing the data by the Rietveld method. Alternatively the amount of the mineral can be obtained by calculation based on the results of the identification of the chemical component and powder X-ray diffraction. In this embodiment, it is preferable to obtain the amount of mineral based on the results of the identification of the chemical component and powder X-ray diffraction.

It should be noted that the content of the chemical component can be obtained by fluorescent X-ray.

It is preferable that the cement admixture of this embodiment contains particles in which free lime, gypsum, Ye'elimite, and ternesite are present in the same particle.

Whether the free lime, gypsum, Ye'elimite, and ternesite are present in the same particle can be confirmed by an electron microscope, etc. Specifically it can be confirmed whether the free lime, gypsum, Ye'elimite, and ternesite are present in the same particle by embedding the cement admixture in a resin, carrying out a surface treatment by argon ion beam, observing the tissue of the particle cross-sectional surface, and carrying out an elemental analysis.

The cement admixture of this embodiment as mentioned above is, for example, preferably used as an expansive material. That is, the expansive material of this embodiment include the cement admixture as already mentioned above. By this way since the cement admixture also has a fine flow retention property at the time of a high temperature, the workability is fine, and further, the cement admixture can have an excellent initial strength expression property.

[2. Cement Composition]

The cement composition of this embodiment contains the cement admixture as already mentioned above. Here, examples of the cement for use in the cement composition, a variety of Portland cements such as normal Portland cement, high-early strength Portland cement, super-early strength Portland cement, low-heat Portland cement, and moderate-heat Portland cement, and a variety of mixed cements of those Portland cements with blast-furnace slag, fly ash, or silica, filler cements mixed with a limestone powder, a blast furnace annealing slug micropowder, etc., and environmental-harmony type cements (Eco Cements) produced by using municipal waste incineration ash or sewage water sludge incineration ash as a raw material, and one kind or two or more kinds of these can be used. Note that the cement admixture can be the expansive material in this embodiment.

In this embodiment, besides the cement, the cement admixture, and a fine aggregate such as sand and a coarse aggregate such as ballast, it is possible to use one kind or two kinds or more from the group consisting of an early strength agent, a rapid hardening material, a water reducing agent, an AE water reducing agent, a high performance water reducing agent, a high performance AE water reducing agent, a fluidizing agent, a defoaming agent, a thickener, an anticorrosive, an anti-freezer, a shrinkage decreasing agent, a condensation decreasing agent, a hydrate heat suppresser, a polymer emulsion, a clay mineral such as bentonite, an anion exchanger such as hydrotalcite, a slug such as a blast furnace granulated slug micropowder or a blast furnace annealing slug micropowder, a limestone micropowder, a siliceous micropowder, gypsum, calcium silicate, and an admixed material such as volcanic ash in the range in which the purpose of the present invention is not substantially inhibited. Furthermore, it is also possible to use in combination with a fibrous substance such as a vinylon fiber, an acrylic fiber or a carbon fiber as the organic-based material.

The use amount (content) of the cement admixture (or the expansive material) is not specifically limited as it varies depending on incorporation of the concrete, but is generally preferably 3 to 12 parts, more preferably 4 to 7 parts in 100 parts of the cement composition comprising the cement and the cement admixture (or an expansive material). By being 3 parts or more, a sufficient swelling performance can be obtained. Furthermore, by being 12 parts or less, generation of swelling crack in the concrete can be prevented without becoming excess swelling.

EXAMPLES

Experimental Example 1

A CaO raw material, an $Al_2O_3$ raw material, a $SiO_2$ raw material and a $CaSO_4$ raw material were incorporated so as to give the mineral percentage shown in Table 1, mixed and pulverized, and then calcinated at 1,200° C. to synthesize clinker, and the clinker was pulverized by using a ball mill to a Blaine specific surface area of 3,000 $cm^2/g$ to prepare a cement admixture.

Note that the mineral composition was obtained by calculation based on the chemical composition obtained from fluorescence X-ray and the identification result of powder X-ray diffraction.

Using this cement admixture, a mortar with a water/cement composition ratio of 50% and a cement composition/sand ratio of 1/3 (mass ratio) was prepared in a room at 20° C. by using 10 parts of the cement admixture in 100 parts of the cement composition including a cement and a cement admixture, and the length variation rate, the flow retention property at the time of a high temperature, and the compression strength were measured. The results are shown in Table 1.

(Use Material)
  CaO raw material: limestone
  $Al_2O_3$ raw material: bauxite
  $SiO_2$ raw material: silica stone
  $CaSO_4$ raw material: anhydrous gypsum
  Sand: JIS standard sand
  Cement: normal Portland cement, commercially available product (Test Method)
  Compression strength: a test body of 4×4×16 cm was prepared according to JIS R 5201, and the compression strengths at an age of 7 days (7 d) and an age of 28 days (28 d) were measured.
  Length variation rate: in accordance with JIS A 6202, the length variation rates an age of 7 days (7 d) and an age of 28 days (28 d) were measured, respectively.
  Flow retention property at high temperature: a mortar was kneaded in accordance with JIS R 5201-2015 "Method for Physical Test of Cement", and the 15 spot flow value immediately after the kneading was measured. Thereafter, the 15 spot flow value after still standing for 60 minutes was measured, and a percentage of the value after still standing for 60 minutes to immediately after the kneading was evaluated, and the flow retention property at 30° C. was measured.

| Experiment No. | Cement admixture materials (part) | | | | | | Ye'elimite/ ternesite | (Free lime + gypsum)/ ternesite | Compression strength ($N/mm^2$) | | Length variation rate/×10$^{-6}$ | | Flow retention property at high temperature (%) | Remarks |
|---|---|---|---|---|---|---|---|---|---|---|---|---|---|---|
| | Free lime | Gypsum anhydride | Ye'elimite | Ternesite | Others | Total | | | 7 d | 28 d | 7 d | 28 d | | |
| 1-1 | 20 | 14 | 30 | 6 | 0 | 100 | 5.0 | 10 | 32.8 | 50.2 | 433 | 20 | 82 | Example |
| 1-2 | 20 | 17 | 30 | 1.5 | 1.5 | 100 | 20.0 | 45 | 32.3 | 48.3 | 540 | 126 | 84 | Example |
| 1-3 | 20 | 47 | 30 | 1 | 1 | 99 | 30.0 | 67 | 31.3 | 48.9 | 553 | 149 | 81 | Example |
| 1-4 | 20 | 47 | 30 | 0.6 | 2.4 | 100 | 50.0 | 111 | 33.7 | 49.4 | 560 | 137 | 66 | Comparative Example |
| 1-5 | 78 | 0 | 20 | 1 | 1 | 100 | 20.0 | 78 | 28.6 | 47.9 | 1250 | 996 | 70 | Comparative Example |
| 1-6 | 70 | 25 | 0 | 3 | 2 | 100 | 0.0 | 31.7 | 27.9 | 48.4 | 1304 | 1018 | 72 | Comparative Example |
| 1-7 | 20 | 47 | 30 | 0 | 3 | 100 | — | — | 33.6 | 47.7 | 630 | 185 | 74 | Comparative Example |

Experimental Example 2

A CaO raw material, an $Al_2O_3$ raw material, an $SiO_2$ raw material and a $CaSO_4$ raw material were incorporated so as to give the mineral percentage shown in Table 2, mixed and pulverized, and then calcinated at 1,200° C. to synthesize clinker, and the clinker was pulverized by using a ball mill to a Blaine specific surface area of 3,000 $cm^2/g$ to prepare a cement admixture.

Note that the mineral composition was obtained by calculation based on the chemical composition obtained from fluorescence X-ray and the identification result of powder X-ray diffraction.

Using this cement admixture, a mortar with a water/cement composition ratio of 50% and a cement composition/sand ratio of 1/3 (mass ratio) was prepared in a room at 20° C. by using 7 parts of the cement admixture in 100 parts of the cement composition including a cement and a cement admixture, and the length variation rate, the flow retention property at the time of a high temperature, and the compression strength were measured in a similar manner to Experimental Example 1. The results are shown in Table 2.

| Experiment No. | Cement admixture materials (part) | | | | | | Ye'elimite/ ternesite | (Free lime + gypsum)/ ternesite | Compression strength ($N/mm^2$) | | Length variation rate/×$10^{-6}$ | | Flow retention property at high temperature (%) | Remarks |
|---|---|---|---|---|---|---|---|---|---|---|---|---|---|---|
| | Free lime | Gypsum anhydride | Ye'elimite | Ternesite | Others | Total | | | 7 d | 28 d | 7 d | 28 d | | |
| 2-1 | 35 | 50 | 8 | 1 | 6 | 100 | 8.0 | 85 | 27.7 | 48.1 | 803 | 554 | 80 | Example |
| 2-2 | 45 | 35 | 16 | 2 | 2 | 100 | 8.0 | 80 | 33.4 | 49.6 | 1271 | 900 | 85 | Example |
| 2-3 | 70 | 10 | 16 | 2 | 2 | 100 | 6.0 | 80 | 27.7 | 48.8 | 1694 | 1311 | 80 | Example |

Experimental Example 3

A CaO raw material, an $Al_2O_3$ raw material, a $SiO_2$ raw material and a $CaSO_4$ raw material were incorporated so as to give the mineral percentage shown in Table 3, mixed and pulverized, and then calcinated at 1,200° C. to synthesize clinker, and the clinker was pulverized by using a ball mill to a Blaine specific surface area of 3,000 $cm^2/g$ to prepare a cement admixture.

Note that the mineral composition was obtained by calculation based on the chemical composition obtained from fluorescence X-ray and the identification result of powder X-ray diffraction.

Using this cement admixture, a mortar with a water/cement composition ratio of 50% and a cement composition/sand ratio of 1/3 (mass ratio) was prepared in a room at 20° C. by using 7 parts of the cement admixture in 100 parts of the cement composition including a cement and a cement admixture, and the length variation rate, the flow retention property at the time of a high temperature, and the compression strength were measured in a similar manner to Experimental Example 1. The results are shown in Table 3.

| Experiment No. | Cement admixture materials (part) | | | | | | Ye'elimite/ ternesite | (Free lime + gypsum)/ ternesite | Compression strength | | Length variation rate | | Flow retention property at high temperature | Remarks |
|---|---|---|---|---|---|---|---|---|---|---|---|---|---|---|
| | Free lime | Gypsum anhydride | Ye'elimite | Ternesite | Others | Total | | | 7 d | 28 d | 7 d | 28 d | | |
| 3-1 | 55 | 30 | 6 | 5 | 4 | 100 | 1.2 | 17 | 28.4 | 49.4 | 1197 | 823 | 84 | Example |
| 3-2 | 36 | 36 | 14 | 7 | 7 | 100 | 2.0 | 10 | 32.4 | 50.0 | 489 | 97 | 80 | Example |
| 3-3 | 36 | 36 | 10 | 15 | 3 | 100 | 0.7 | 5 | 32.3 | 48.9 | 421 | 86 | 84 | Example |
| 3-4 | 36 | 36 | 6 | 22 | 0 | 100 | 0.3 | 3 | 33.0 | 48.9 | 301 | −104 | 71 | Comparative Example |

INDUSTRIAL APPLICABILITY

The cement admixture of the present invention can be widely used in the civil engineering and architecture fields where a concrete is used.

The invention claimed is:

1. A cement admixture, comprising free lime, gypsum anhydride, Ye'elimite, and ternesite, wherein a mass ratio of the Ye'elimite to the ternesite (Ye'elimite/ternesite) is 0.5 to 40.

2. The cement admixture according to claim 1, wherein the cement admixture contains 20 to 80 mass % of the free lime.

3. The cement admixture according to claim 1, wherein a total mass ratio of the free lime and the gypsum anhydride to the ternesite ((free lime+gypsum anhydride)/ternesite) is 20 to 90.

4. An expansive material comprising the cement admixture according to claim 1.

5. A cement composition comprising the cement admixture according to claim 1.

* * * * *